Jan. 9, 1934.  C. H. FISCHER ET AL  1,942,595
POST BINDER
Filed April 30, 1930
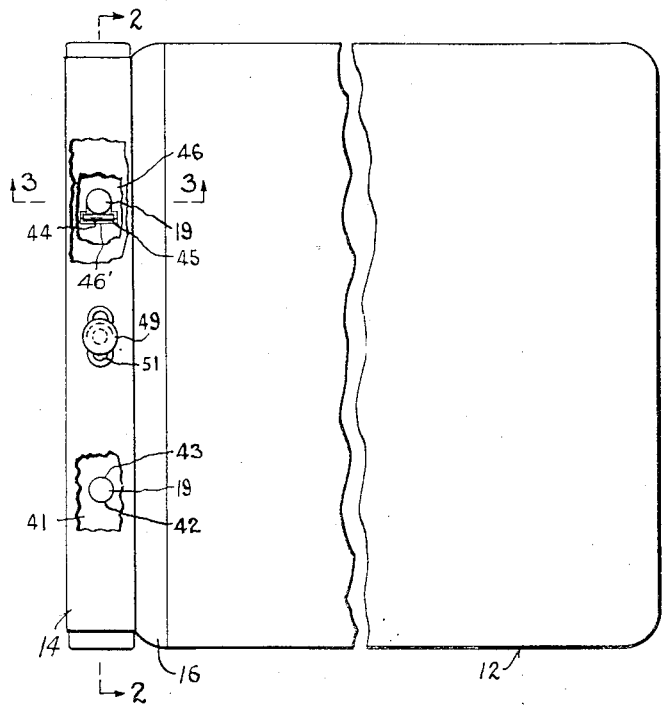
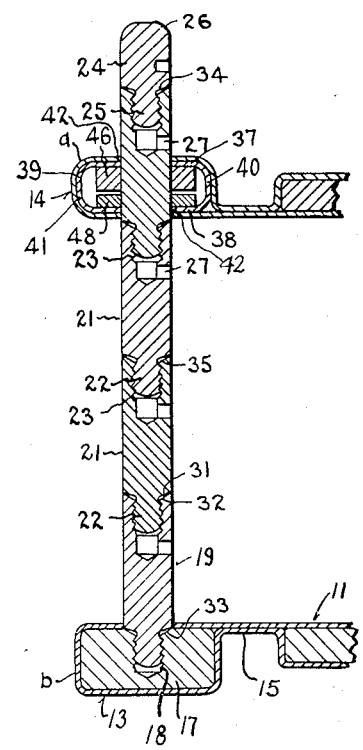
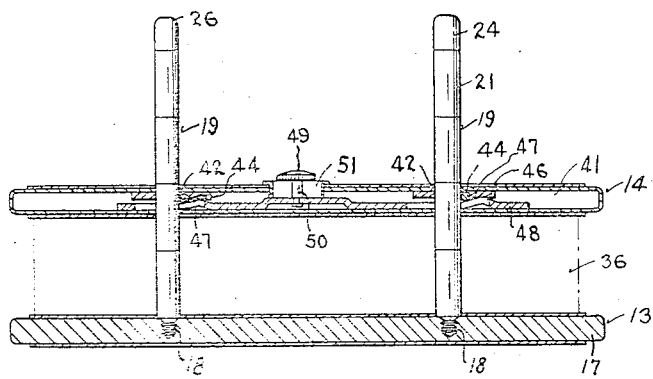
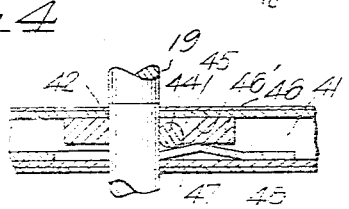
INVENTORS:
Charles Harry Fischer
Frederick P. Fischer
BY
ATTORNEY.

Patented Jan. 9, 1934

1,942,595

UNITED STATES PATENT OFFICE 1,942,595

POST BINDER

Charles Harry Fischer and Frederick H. Fischer, Cincinnati, Ohio

Application April 30, 1930. Serial No. 448,638

3 Claims. (Cl. 287—125)

Post binders now embody sectional posts, the posts respectively consisting of sections respectively having a threaded socket at one end and a threaded screw at the other end, the end walls surrounding said socket and said screw extending in planes perpendicular to the axes of said sections, forming square shoulders, the superposed post-sections having threaded connections by means of such threaded sockets and screws for building up the posts to the desired height.

It has been found in practice, however, that posts which are thus constructed and built up, in spite of the utmost care in manufacture, are non-rigid and are not straight, the mating pairs of posts in a post binder being for instance non-parallel, and the superposed sections of the respective posts being offset in various radial directions with relation to each other, producing crooked posts, so that the spaced-apart locking devices on the cover, when in unlocked relation, bind upon different portions of the posts, depending on the directions in which the respective post-sections are deflected out of true positions, making the manipulation of the devices for inserting or removing sheets difficult and the locking devices insecure.

It is the object of our invention to remove such defects and to provide a post binder with posts comprising post-sections which extend in right lines when connected, and in which the built-up posts are parallel with each other and uniformly laterally spaced throughout the height of the posts to conform to the spaced-apart relation of the locking devices regardless of the height of the posts.

The invention will be further readily understood from the following description and claims, and from the drawing, in which latter:

Fig. 1 is a plan view of a post binder embodying our invention, partly broken away.

Fig. 2 is a longitudinal section of our improved device, taken in the plane of the line 2—2 of Fig. 1.

Fig. 3 is a cross-section of the same, taken in the plane of the line 3—3 of Fig. 1; and Fig. 4 is an enlarged cross-sectional detail view of the clamp about the post, taken in the plane of the line 2—2 of Fig. 1.

The binder is exemplified as comprising covers 11, 12, including an anchoring section 13 and a locking section 14, the anchoring section and the locking section being connected with the body portions of the respective covers by flexible connections 15, 16.

An anchoring plate 17 is provided in the anchoring section. It has threaded sockets 18 which are spaced apart a fixed distance in the anchoring plate. The axes of the threaded sockets are perpendicular to the anchoring plate and parallel with each other. The lower ends of posts 19 are threaded into the threaded sockets.

A series of post-sections 21 is provided for each of the posts. Each of these post-sections is provided with a threaded screw 22 at one of its ends and a threaded socket 23 at the other of its ends. Any number of these post-sections may be superposed, depending on the height to which it is desired to build up the posts. There is a finishing post-section 24 at the top of each of these posts. This finishing post-section in the present instance is provided with one of the axial screws 25, the outer end of the finishing post-section being usually provided with a finishing rounding 26. Each of the post-sections is preferably provided with a hole 27 in its side for the reception of a suitable wrench for screwing up the post-sections tightly or unscrewing the same.

The respective post-sections are provided with an encircling end wall 31 surrounding the screw and an encircling end wall 32 surrounding the threaded socket. The threaded sockets in the anchor plate and the inner end of the finishing post-section are provided with similar end walls 33, 34. The proximate ones of these end walls, when the post-sections are in superposed relation in the binder, are complemental to each other.

The complemental end walls are so relatively formed that their outer margins contact while their inner portions are spaced from each other, whereby centering anchoring means are formed between proximate end walls by annular contacts distanced radially from the threaded screw and the threaded socket, the distanced annular contact lines forming fulcrums at the outer margins of said proximate end walls for resisting lateral displacement or bending stress in all radial directions between the post-sections and between the post-sections and their anchoring means.

This structure and arrangement further insures that the posts extend in truly perpendicular directions and parallel to each other from the anchoring plate.

The mating end walls are shown frusto-conical in form, the frustums of the cones respectively extending outwardly on one of the end faces, for instance at the screw end of the post-sections, and inwardly on the other of said end walls, for instance at the socket end of the post-sections and the sockets in the anchorplate.

The mating frusto-conical surfaces are preferably of different inclinations, the inwardly extending frusto-conical surface of the pair of mating frusto-conical surfaces having greater inclination, so as to cause intimate contact between the outer margins of said mating end walls, the inner portions of said mating end walls being spaced from each other as shown at 35.

The provision of the outwardly extending frustum of the cone also aids in insuring relative centering between the proximate end faces and insures coincident axial alinement between proximate post-sections, in spite of looseness of fit in the threaded connections between superposed post-sections.

In our improved structure the post-sections are provided with outer annular margins, said post-sections at said annular margins being of greater length than the distance between the inner portions of the end walls of said respective post-sections, for insuring intimate contact between the marginal portions of superposed post-sections and the drawing together of said superposed post-sections by the threaded connections in the interior of said post-sections causing the outer margins of said post-sections to coact for centering said post-sections relatively to each other and insuring their coincident axial alinement in rigid relation for providing parallel post-sections in the post binder.

The cover 12 of the post binder is usually provided with a locking plate 41. This locking plate is a hollow structure formed of a metal sheet which is bent in cross-section and includes an upper wall 37 and a lower wall 38 and edge walls 39 and 40. These walls are rigid with relation to each other. The upper wall and the lower wall are provided with holes 42 through which the outer ends of the posts are received, the holes being provided with encircling walls 43 received closely about the posts. Complemental clamping parts 44 are suitably actuated and form locking means for locking the locking plate to the posts at suitable points lengthwise of the posts, depending upon the thickness of the leaf-section 36 of the book. This leaf-section in practice varies in thickness, and post-sections may be added or removed according to the thickness of the leaf-section from time to time.

The holes in the locking plate are in practice a fixed distance apart, and the locking means in practice usually cause clamping or locking between the walls of the holes and the binding posts for locking the parts together.

Fabric or other coverings for the parts are exemplified at $a$ and $b$. These coverings may be used in forming the flexible connections 15 and 16.

The locking means may be of any suitable construction. Each of the locking means exemplified includes the clamping part 44, shown as a roller, let into a slot 45 of a plate 46, the roller being moved lengthwise of the locking-plate for release of the post along the wedge face 46' at the end of said slot, being raised by wedge-faces 47 on a slide 48, slidable lengthwise of the locking plate, and suitably manipulated, as by means of a button 49, the shank 50 of which is received through a slot 51 in the locking plate and fixed at its inner end to the slide.

When the parts are to be assembled, the plate 48 is moved to the right, as viewed in Figs. 2 and 4, and the rollers 44 permitted to drop along the wedge end faces 46' of the slots 45. Downward pressure on the plate 41 moves the plate and the upper cover downwardly along the posts, the rollers 44 following in such movement. When the plate is released, the wedge faces 46' clamp the rollers against the posts for clamped assembly of the parts.

In our improved device the attaching means between the separable post-sections, and between the intermediate post-sections and the anchoring plate at one end and the finishing post-section at the other end, are formed by joints between end contact faces, the annular end contact lines of which are of substantially as great diameter as the diameters of the post-sections, and the end contact lines between the mating end walls in the joints are radially spaced from the threaded connections in said joints. Said end contacts comprise a tapering end face for relatively centering proximate end walls, and the clamping contacts in said joints are spread to include a maximum diameter of contact for resisting unscrewing in said joints.

Our improved device provides a rigid straight post in spite of looseness in the threading between post-sections.

Having thus fully described our invention, what we claim as new, and desire to secure by Letters Patent, is:

1. A joint for a binder post consisting of two sections, one having a threaded axial socket and the other having a threaded axial screw to cooperate with said socket and encircling tapered shoulders one funnelled and the other conical about said socket and said screw and having outer annular margins, the pitch of the funnelled taper being greater than that of the conical taper, and the outer annular margins of said encircling shoulders spaced radially from said socket and said screw and forming fulcrums for aligning said sections with relation to each other upon screwing said sections together.

2. A joint connecting the proximate sections of a binder post comprising the following: one of said proximate sections having a threaded axial socket and the other having a threaded axial screw to cooperate with said socket and encircling shoulders respectively about said socket and said screw, said shoulders having outer annular margins which contact each other as mutually acting fulcrums when said proximate sections are screwed together and the portions of said shoulders inside said margins being spaced apart when said margins so contact each other for fixing axial alignment between said proximate sections.

3. A joint for a binder post connecting proximate ends of proximate sections of said post, one of said ends having a threaded axial socket and the other of said ends having a threaded axial screw to cooperate with said socket and encircling tapered shoulders one funnelled and the other conical about said socket and said screw and having outer annular margins, the pitch of the funnelled taper being greater than that of the conical taper, and said outer annular margins of said encircling shoulders spaced radially from said socket and said screw and forming fulcrums for aligning said sections with relation to each other.

CHARLES HARRY FISCHER.
FREDERICK H. FISCHER.